April 26, 1960 J. SUTTON ET AL 2,934,715
GRID BIAS CONTROL FOR CLASS-B AMPLIFIER
Filed Sept. 17, 1956
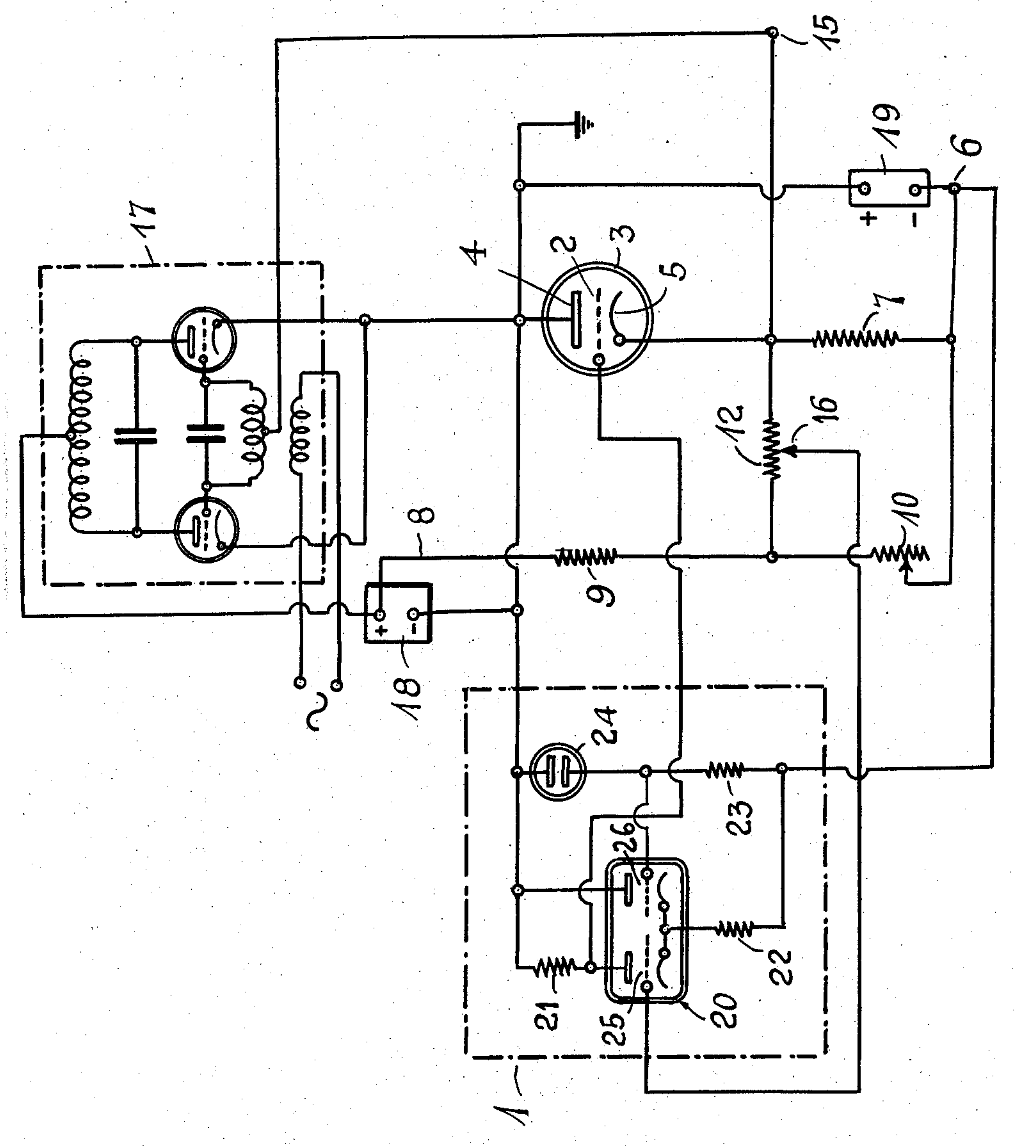
INVENTORS
Joseph Sutton,
Robert Banks,
BY Baldwin & Wight
ATTORNEYS United States Patent Office 2,934,715

Patented Apr. 26, 1960

2,934,715

GRID BIAS CONTROL FOR CLASS-B AMPLIFIER

Joseph Sutton, Little Baddow, England, and Robert Banks, Campbeltown, Argyll, Scotland, assignors to Marconi's Wireless Telegraph Company Limited, London, England, a company of Great Britain Application September 17, 1956, Serial No. 610,142

2 Claims. (Cl. 330—139)

This invention relates to television and like transmitters and has for its object to provide improved and simple means whereby the radiated black level in the composite video and synchronizing signal wave and which occurs before and after every synchronizing pulse is maintained substantially constant. The invention can also be applied to amplifiers, in which it is required to maintain constant output despite variations on the main supply voltage.

This application is a continuation-in-part of our application Serial Number 304,932, filed August 18, 1952, for Television and Like Transmitters.

The maintenance of substantial constancy of the black level signal is one of the more serious practical difficulties encountered in the design of television and like transmitters. The required constancy is normally to ±2% or less and it is by no means easy to satisfy this requirement. One of the factors adversely affecting this constancy is variation of the high tension voltage to the radio frequency amplifiers of the transmitter. This may occur from any of a variety of causes e.g. variations in the mains supply voltage, or the normal variations in the video signal, when using normal rectifier circuits for deriving the said H.T. voltage. Thus in an ordinary known television transmitter the H.T. voltage is different in the case of an all white signal from that obtained in the case of an all black signal and accordingly the black level will be different in the two cases. This source of lack of constancy can, of course, be countered by providing electronic stabilization of the H.T. supply but although this expedient is used in small television transmitters it has the defect of involving expensive extra equipment and excessive power consumption. Another known expedient for meeting this particular difficulty is that of designing the high tension rectifier and its associated filter circuit to be of substantially constant impedance over the whole range of video signal frequencies but here again difficulties of design and high cost of equipment arise because the achievement of such constant impedance together with the maintenance of the required smoothing qualities of the filter involve the use of very large condensers. Moreover, such an arrangement does not stabilize the black level signal in the case of variations in the mains supply voltage.

The present invention provides simple and economical means of achieving substantial constancy of radiated black level with a minimum of extra equipment. The invention is applicable to transmitters in which modulation is effected at an intermediate power level and the modulated signals are then amplified by means of substantially linear amplifiers (usually class B amplifiers) employing an absorber valve in their grid bias circuit. The invention also has the effect that ripple on the radiated signal due to ripple on the H.T. supply, is considerably reduced, so that for a given noise requirement on the signal, the smoothing on the H.T. supply may be reduced.

The invention is based upon the fact that the output of a linear amplifier such as a class B amplifier can be maintained substantially constant despite changes in the H.T. voltage by suitably varying the grid bias voltage by an amount dependent upon the change in the H.T. voltage.

According to this invention a television or like transmitter comprises phase inverting means and absorber valve means for superimposing upon the grid bias applied to a linear amplifier of said transmitter a component of voltage which is dependent upon the anode voltage present at said amplifier and is of such sense and magnitude as to maintain the output from said amplifier substantially constant over a predetermined range of H.T. variation.

In one way of carrying out the invention, the grid bias for at least one linear amplifier is derived from a conventional stabilizer, into the amplifier circuit of which a portion of the linear amplifiers' H.T. voltage is injected, in such a manner that grid bias of said linear amplifier varies as required.

The invention is illustrated in the accompanying simplified diagrammatic drawing which shows one embodiment.

Referring to the drawing which shows only those parts of the circuit necessary to an understanding of the present invention, 1 is a stabilizing amplifier whose output is applied to the control grid 2 of an absorber valve 3, i.e. a valve for absorbing excessive current from the grid circuit of the linear amplifier as defined in the 1954 edition of Chamber's Technical Dictionary. The anode 4 of the absorber valve 3 is earthed and the cathode 5 is connected to the negative supply terminal 6 of its substantially stable D.C. grid bias source 19 through a resistance 7. The actual voltage at the anode H.T. supply point of the linear amplifier 17 (a typical known linear amplifier is shown by way of example) is applied at 8 from a source 18 to one end of a potentiometer comprising series resistances 9 and 10 and a shunt branch consisting of resistance 12 in series with resistance 7. The resistance 10 is preferably adjustable, and bias voltage for the linear amplifier 17 is taken off at terminal 15 as shown. An adjustable tap 16 on the resistance 12 is led back to the input side of the stabilizer amplifier 1.

The stabilizer amplifier may comprise a double triode valve 20 to the grid 26 of which a reference voltage is applied. This reference voltage is obtained from the junction of the neon tube 24 and the resistance 23, these being connected in series across the voltage 19. The voltage obtained at the tap 16 is applied to the grid 25 of the double triode valve. The output voltage from the stabilizer amplifier is applied to grid 2 of the absorber valve 3.

The term "linear amplifier" as used in the specification refers to class B amplifiers of the type shown in the text by Frederick E. Terman, on "Radio Engineering," page 210, first edition. The stabilizer amplifier is of the type described in vol. 18 of the Radiation Laboratory Series No. 18 "Vacuum Tube Amplifiers" by Wallman, page 462.

The resistance 10 is adjusted to such a value that when the anode voltage at the terminal 8 and the grid bias voltage at the terminal 15 are of predetermined mean values there is zero voltage drop across the resistance 12. If, in these circumstances the voltage at the terminal 8 remains constant the input signal to the stabilizer amplifier will consist only of changes in the bias voltage at 15 and the arrangement will act as a normal stabilizer. If, however, the voltage at 8 changes, a corresponding voltage appears across the resistance 12 and a proportion of it, as determined by the setting of the tap 16, is transferred to the input side of the amplifier 1 and thereby causes a corresponding correction to the bias voltage at 15. The ratio of this correcting change to the change in voltage at terminal 8 is determined by the position of the tap 16 on the resistance 12. In practice this is set by trial and error to give substantially constant black level in the transmitted signal.

While we have described our invention in its preferred embodiment we realize that changes may be made and we desire that it be understood that no limitations upon our invention are intended other than may be imposed by the scope of the appended claims.

What we claim as new and desire to secure by Letters Patent of the United States is as follows:

1. In a television transmitter adapted to transmit a composite video and synchronizing signal wave wherein black level occurs immediately before and after each synchronizing signal, a transmitter circuit including a linear amplifier having at least an anode, a grid and a cathode, a source of D.C. anode potential feeding said linear amplifier, an absorber valve for absorbing excessive grid current from the grid circuit of said linear amplifier and having an anode, a grid, and a cathode, a cathode circuit for said valve, a connection extending from a point in said cathode circuit to the grid of said linear amplifier for feeding bias potential thereto, a phase inverting stabilizing amplifier having input and output circuits, with said output circuit connected to the grid of said absorber valve, and means including an impedance connected between said point and said source of D.C. potential for applying signals representative of the difference in variations of the potentials of said point and of said source to the input circuit of said stabilizing amplifier, said stabilizing amplifier applying a potential to the grid of said absorber valve which varies in opposite polarity to variations in amplitude in said source of direct current potential whereby the current through said absorber valve varies inversely with the current through said stabilizing amplifier to control the potential of said point to compensate for said difference.

2. In a television transmitter adapted to transmit a composite video and synchronizing signal wave wherein black level occurs immediately before and after each synchronizing signal, a transmitter circuit including a linear amplifier having at least an anode, grid and cathode, a first source of D.C. potential feeding said linear amplifier, an absorber valve for absorbing excessive grid current from the grid circuit of said linear amplifier and having an anode, a grid, and a cathode, a cathode circuit for said valve, a connection extending from a point in said cathode circuit to the grid of said linear amplifier for feeding bias potential thereto, a second source of D.C. potential for said absorber valve, a resistance connected between said point and the negative terminal of said second source, a potentiometer connected between the positive terminal of said first source and the negative terminal of said second source, a further resistance connected between said point and an intermediate point on said potentiometer, and a phase inverting stabilizing amplifier having input and output circuits, with said input circuit fed with potential from an intermediate point of said further resistance and said output circuit connected to the grid of said absorber valve, said stabilizing amplifier being so arranged as to produce a negative going output signal in response to a positive going input signal and vice versa, said stabilizing amplifier applying a potential to the grid of said absorber valve which varies in opposite polarity to variations in amplitude in said source of direct current potential whereby the current through said absorber valve varies inversely with the current through said stabilizing amplifier.

References Cited in the file of this patent

UNITED STATES PATENTS

| | | |
|---|---|---|
| 2,270,295 | Harley | Jan. 20, 1942 |
| 2,361,889 | Walsh | Oct. 31, 1944 |
| 2,662,188 | Crumrine et al. | Dec. 8, 1953 |
| 2,766,332 | Henderson | Oct. 9, 1956 |

FOREIGN PATENTS

| | | |
|---|---|---|
| 629,357 | Great Britain | Sept. 19, 1949 |